(12) United States Patent
Reinhardt

(10) Patent No.: US 8,336,814 B2
(45) Date of Patent: Dec. 25, 2012

(54) AIRCRAFT

(75) Inventor: Oliver Reinhardt, Stuttgart (DE)

(73) Assignee: Flight-Design-GmbH Flugsportgerate, Leinfelden-Echterdingen (DE)

( * ) Notice: Subject to any disclaimer, the term of this patent is extended or adjusted under 35 U.S.C. 154(b) by 445 days.

(21) Appl. No.: 12/595,205

(22) PCT Filed: Mar. 29, 2008

(86) PCT No.: PCT/DE2008/000543
§ 371 (c)(1),
(2), (4) Date: Oct. 8, 2009

(87) PCT Pub. No.: WO2008/125077
PCT Pub. Date: Oct. 23, 2008

(65) Prior Publication Data
US 2010/0064689 A1 Mar. 18, 2010

(30) Foreign Application Priority Data
Apr. 11, 2007 (DE) .......... 10 2007 017 332

(51) Int. Cl.
*B64D 27/00* (2006.01)

(52) U.S. Cl. ............ 244/55; 244/53 R; 244/58

(58) Field of Classification Search .......... 244/13, 244/53 R, 58, 55, 65
See application file for complete search history.

(56) References Cited

U.S. PATENT DOCUMENTS

| | | | | |
|---|---|---|---|---|
| 1,717,552 A * | 6/1929 | Dunn | ............... | 244/58 |
| 1,791,707 A * | 2/1931 | Botka, Jr. | .......... | 244/58 |
| 1,851,857 A * | 3/1932 | Marney | ............ | 244/58 |
| 2,368,630 A * | 2/1945 | Bizjak | ............... | 244/58 |
| 2,896,882 A * | 7/1959 | Nelson | ............. | 244/58 |
| 4,165,795 A | 8/1979 | Lynch et al. | | |
| 4,605,185 A | 8/1986 | Reyes | | |
| 5,480,107 A * | 1/1996 | Bacon | ............. | 244/58 |
| 6,040,634 A | 3/2000 | Larguier | | |
| 7,622,821 B2 * | 11/2009 | Mehrer et al. | .......... | 244/58 |
| 7,922,117 B2 * | 4/2011 | Wavering et al. | ............. | 244/58 |
| 2004/0211862 A1 | 10/2004 | Elam | | |
| 2007/0012492 A1 | 1/2007 | Deng et al. | | |
| 2008/0184906 A1* | 8/2008 | Kejha | ............ | 244/13 |

FOREIGN PATENT DOCUMENTS

| | | |
|---|---|---|
| BE | 1012040 | 4/2000 |
| DE | 195 12 816 | 10/1996 |
| DE | 101 56 868 | 5/2003 |
| FR | 2 883 805 | 10/2006 |

OTHER PUBLICATIONS

ISA European Patent Office, International Search Report of PCT/DE2008/000543, Jul. 14, 2008, WIPO, 4 pages.

* cited by examiner

*Primary Examiner* — Christopher P Ellis
(74) *Attorney, Agent, or Firm* — Alleman Hall McCoy Russell & Tuttle LLP

(57) ABSTRACT

An aircraft, comprising an internal combustion engine by whose drive power a propeller can be driven, wherein the internal combustion engine cooperates with an electric machine which in a first operating mode is operable as electric motor and in a second operating mode as electric generator.

17 Claims, 2 Drawing Sheets

AIRCRAFT

CROSS-REFERENCE TO RELATED APPLICATIONS

This is the U.S. National Phase of International PCT Application Serial No. PCT/DE2008/000543, filed Mar. 29, 2008, which claims priority to German Patent Application No. 10 2007 017 332.8, filed on Apr. 11, 2007, both of which are hereby incorporated by reference in their entirety for all purposes.

TECHNICAL FIELD

This invention relates to an aircraft, comprising an internal combustion engine by whose drive power a propeller can be driven.

BACKGROUND AND SUMMARY

In airplanes driven by an internal combustion engine, gasoline engines, diesel engines or two-cycle engines mostly are used. In certain flight phases, these internal combustion engines are operated with increased power. The excess power produced thereby is required for instance during take-off of the aircraft or in the safety-critical climbing phase subsequent to take-off. The internal combustion engine, however, is operated with a particularly high rotational speed and load, whereby wear is increased superproportionally.

In addition, airplanes are known, which are driven exclusively by an electric motor. DE 195 12 816 A1 proposes a glider with auxiliary motor which constitutes an electric motor, wherein the energy supply of the electric motor is ensured by a battery means arranged in the wings.

When a conventional airplane with an internal combustion engine requires an increased drive power, it has been necessary so far to use an internal combustion engine of greater power. The resulting increase in weight, however, has led to higher requirements of the aircraft structure and hence to an increased total weight.

Therefore, it is the problem underlying the invention to provide an aircraft which can provide an increased drive power, without the mass of the drive being significantly increased thereby.

For the solution of this object in accordance with the invention, it is provided in an aircraft as mentioned above that the internal combustion engine cooperates with an electric machine, which in a first operating mode is operable as electric motor and in a second operating mode as electric generator.

This invention is based on the knowledge that the electric motor can be combined with the electric machine to form a hybrid motor, in order to support the internal combustion engine and provide an increased drive power in certain operating conditions. Primarily, the electric machine merely is used during short flight phases, for instance during take-off or in climbing flight, and then supplies a safety-relevant excess of power. It is preferred that the additional drive power amounts to about 15% to 35%, preferably 20%, of the power of the internal combustion engine. However, the mass increase caused by the electric machine and possibly required further components lies distinctly below the mass increase during use of a more powerful internal combustion engine. When the additional power no longer is required, the electric machine is switched off or switched into the second operating mode and then acts as an electric generator. The electric machine is connected with at least one accumulator as energy storage device, which provides the energy required during operation as electric motor and can be charged in the second operating mode during operation as generator. Upon termination of the charging operation, the additional drive power can be retrieved again. This provides the advantage that in cruising flight the internal combustion engine is loaded more efficiently, whereby the fuel consumption is reduced due to a more favorable design of the internal combustion engine.

Preferably, the aircraft of the invention includes two or more accumulators which are arranged in the wings. This provides a more favorable mass distribution of the aircraft, so that the aircraft structure can be designed lighter in weight, which in turn leads to a reduced power demand and a reduced fuel consumption.

In the aircraft of the invention, another advantage is obtained when the at least one accumulator provides the energy for the on-board power supply of the aircraft. In this case, a separate accumulator can be omitted, whereby the mass of the aircraft is further reduced.

In accordance with a development of the invention it can be provided that the electric machine is designed for starting the internal combustion engine. The electric machine then serves as starter generator, so that a separate electric motor as starter can be omitted, whereby a further reduction of the mass of the drive is obtained.

In the aircraft of the invention, the electric machine can be connected with the crankshaft of the internal combustion engine rigidly or via a clutch. When a clutch is present, the electric machine particularly advantageously only is connected with the internal combustion engine when required, i.e. when the electric machine is operated as electric motor and provides the increased power, or alternatively when the electric machine is operated as generator and charges the accumulator. In all other flight conditions, the electric machine can be coupled out, so that it does not exert a load on the internal combustion engine. Configurations are conceivable, however, in which the electric machine is rigidly connected with the crankshaft of the internal combustion engine. The electric machine acts as an additional centrifugal mass, which with a suitable design leads to a smoother run of the internal combustion engine. Accordingly, additional centrifugal masses as used in conventional internal combustion engines can be omitted.

In accordance with a first aspect of the invention it can be provided that the electric machine is arranged at the end of the crankshaft opposite to the propeller. In accordance with an alternative aspect, it can, however, also be provided that the electric machine is arranged on the crankshaft between propeller and internal combustion engine. Possibly, the electric machine can be coupled or capable of being coupled to the crankshaft via a propeller transmission or a separate transmission or via a belt drive.

It is particularly preferred that the aircraft of the invention includes a control unit which controls a carburetor or an injection system of the internal combustion engine and a charging and power electronics for the electric machine. With the power electronics, the actuation of the electric machine is accomplished during operation as electric motor. The charging electronics additionally can include a device for monitoring the condition of the accumulator.

A particularly simple operation of the aircraft of the invention is obtained when the control unit is operable by a control element preferably constituting a single-lever control. The pilot merely operates a power lever in a conventional way, whereas the control of the electric machine, in particular switching on or off the first operating mode as electric motor and switching on and off the second operating mode as generator is performed automatically by the control unit, in particular in dependence on the position of the control element, preferably of the power lever. Control and switching are effected automatically and hence without action of the pilot, whereby operating errors are excluded.

The invention can be used in all aircrafts driven by an internal combustion engine, in particular in motor airplanes, ultralight aircrafts, trikes, motor gliders and gliders with auxiliary engine. In addition, it is also suitable for those aircrafts which are permitted as Light Sport Aircraft (LSA) or Very Light Aircraft (VLA).

BRIEF DESCRIPTION OF FIGURES

Further advantages and details of the invention will be explained by means of an embodiment with reference to the Figures. The Figures are schematic representations, in which.

DETAILED DESCRIPTION

Figure 1:
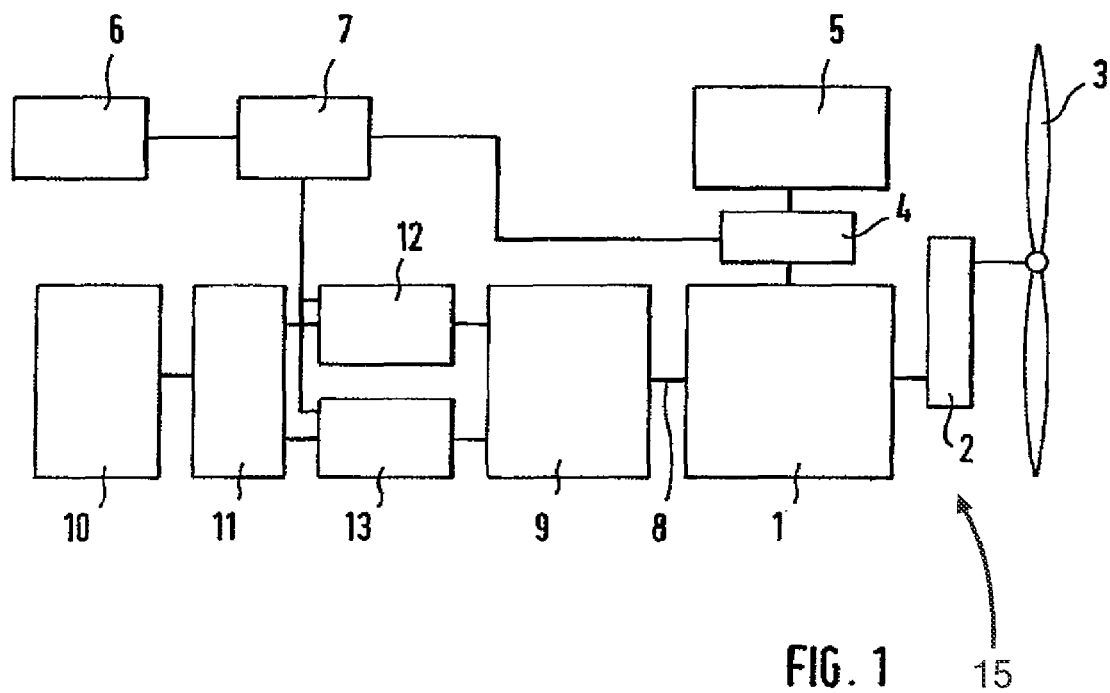
FIG. 1 shows a block circuit diagram of the essential components of the drive of an aircraft of the invention.

FIG. 1 shows the essential components of the drive 15 of an aircraft of the invention. An internal combustion engine 1 is connected with a propeller 3 via a propeller transmission 2 in a conventional way. To the internal combustion engine 1, a carburetor 4 or alternatively an injection is connected; the supply with fuel is effected via a tank 5. In the cockpit of the aircraft, a power lever 6 is provided, which is operated by the pilot depending on the power demand desired. The power lever 6 is connected to a control unit 7, which in turn is connected with the carburetor 4 or the injection. In dependence on the position of the power lever 6, the control unit 7 controls the operation of the internal combustion engine 1 by controlling the carburetor 4 or the injection.

In contrast to conventional internal combustion engines, an electric machine 9 is connected to the end of the crankshaft 8 schematically shown in FIG. 1 opposite to the propeller 3. Connection is effected via a clutch not shown in FIG. 1, so that the electric machine 9 either is coupled with the crankshaft 8 or is decoupled from the same. In a first operating mode, the electric machine 9 can be operated as electric motor. It drives the crankshaft 8, so that in general an increased drive power can be provided to the propeller 3. When the electric machine 9 is operated as electric motor, it receives the required energy from an accumulator 10. In FIG. 1, the accumulator 10 merely is shown schematically; preferably, a plurality of accumulators are provided, with at least one accumulator being arranged in each wing. The accumulator 10 is connected to a unit 11 for monitoring the accumulator, which is connected with a power electronics 12 and a charging electronics 13. The above-mentioned control unit 7 likewise is connected with the power electronics 12 and the charging electronics 13.

In the first operating mode, when the electric machine 9 is operated as electric motor, the energy required by the power electronics 12 is provided by the accumulator 10. When the electric machine 9 is operated as electric motor, the drive 15 provides an increased peak power, without the internal combustion engine 1 being overloaded. This increased peak power is required for instance during take-off or during the safety-critical climbing phase. Subsequently, the pilot will choose a smaller power via the power lever 6. Via the control unit 7, the changed position of the power lever 6 is registered, and the electric machine 9 no longer is operated in the first operating mode as electric motor. The electric machine either is uncoupled from the internal combustion engine by means of the clutch arranged on the crankshaft 8 or the electric machine 9 is switched into the second operating mode, in which it is operated as electric generator. In operation as generator, the electric machine 9 is driven by the crankshaft 8 driven by the internal combustion engine 1. Charging of the accumulator 10 is controlled via the charging electronics 13 and the means 11 for monitoring the accumulator. When the accumulator 10 has reached a defined charging condition, the electric machine 9 can be switched off or be uncoupled from the crankshaft 8.

Figure 2:
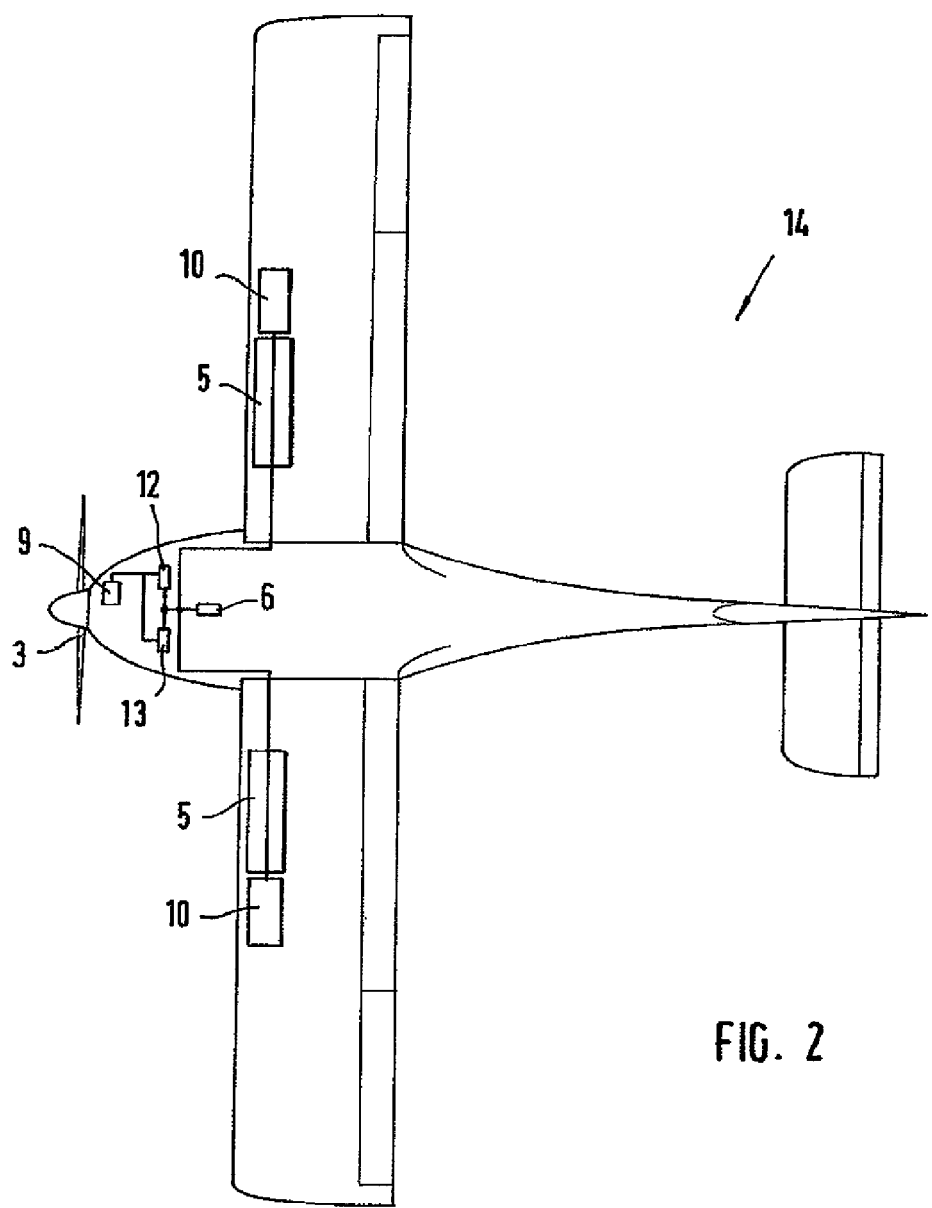
FIG. 2 shows a top view of an embodiment of an aircraft of the invention.
Figure 3:
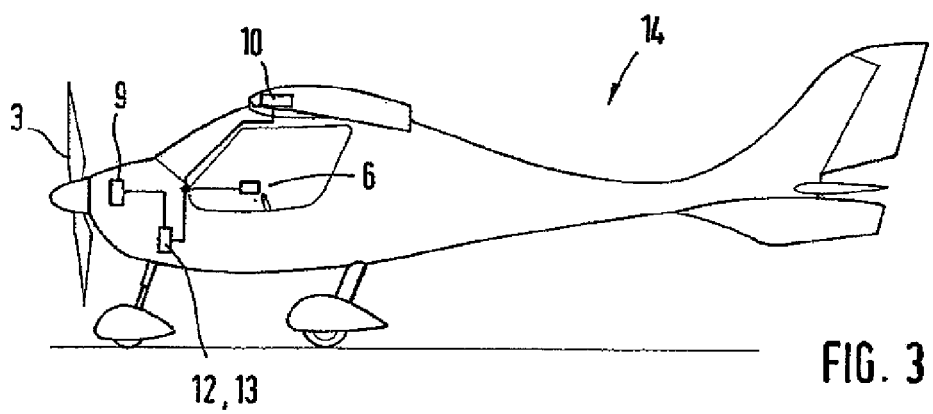
FIG. 3 shows a side view of the aircraft of FIG. 2.

FIGS. 2 and 3 show the aircraft 14 in a top view and in a side view. As is shown best in FIG. 2, an accumulator 10 is located inside each wing before the wing spar beside the tanks 5. The internal combustion engine and the electric machine 9 are located in the aircraft nose and drive the propeller 3. The power electronics 12 and the charging electronics 13 are arranged in the vicinity of the electric machine 9. The power lever 6 is located in the cockpit.

The accumulator 10 also serves the on-board power supply of the aircraft 14. The electric machine 9 also serves for starting the internal combustion engine 1; a separate starter does not exist.

The invention claimed is:

1. An aircraft, comprising:
a propeller;
an aircraft drive including an internal combustion engine and a transmission, the internal combustion engine coupled to the propeller directly via the transmission and having a drive power to drive the propeller; and
an electric machine rigidly coupled with the aircraft drive via a belt drive, wherein the internal combustion engine cooperates with the electric machine, and wherein the electric machine is operated as an electric motor in a first operating mode and as an electric generator in a second operating mode, wherein during electric motor operation the electric machine provides additional drive power amounting to 15 to 35% of a rated power of the internal combustion engine.

2. The aircraft according to claim 1, wherein the electric machine is connected with at least one accumulator as an energy storage device, which provides energy required during electric motor operation and/or can be charged during generator operation.

3. The aircraft according to claim 2, further comprising at least two accumulators which are arranged in wings of the aircraft.

4. The aircraft according to claim 3, wherein at least one accumulator provides energy for an on-board power supply of the aircraft.

5. The aircraft according to claim 1, wherein the electric machine starts the internal combustion engine.

6. The aircraft according to claim 5, wherein the electric machine is connected with a crankshaft of the internal combustion engine rigidly.

7. The aircraft according to claim 6, wherein the electric machine is arranged on the crankshaft between the propeller and the internal combustion engine.

8. The aircraft according to claim 1, wherein the electric machine is coupled to the transmission of the aircraft drive via the belt drive.

9. The aircraft according to claim 1, further comprising a control unit which controls a carburetor or an injection system of the internal combustion engine and charging and power electronics of the electric machine.

10. The aircraft according to claim 9, wherein the control unit is operable by a control element constituting a single-lever control.

11. The aircraft according to claim 10, wherein the control unit automatically switches the electric motor operation of the electric machine on and off and the generator operation of the electric machine on and off in dependence on a position of the control element.

12. The aircraft according to claim 1, wherein the aircraft constitutes a motor airplane, ultralight aircraft, trike, motor glider, glider with auxiliary engine, Light Sport Aircraft (LSA) or Very Light Aircraft (VLA).

13. A method for controlling an aircraft, comprising:
during a first flight mode including take-off or climbing flight,
operating an engine of an aircraft drive to drive a propeller, the engine coupled to the propeller directly via a transmission of the aircraft drive, and
operating an electric machine as a motor to further drive the propeller, the electric machine rigidly coupled with the aircraft drive via a belt drive, wherein during electric motor operation the electric machine provides additional drive power amounting to 15 to 35% of a rated power of the engine; and
during a second flight mode following the first mode, operating the engine to drive the propeller and selectably operating the electric machine as a generator to store energy in an accumulator.

14. The method of claim 13 further comprising starting the engine with the electric machine.

15. The method of claim 13, further comprising adjusting the engine in response to a single-lever control, and automatically switching the electric motor operation of the electric machine on and off and the generator operation of the electric machine on and off in dependence on a position of the single-lever control.

16. The method of claim 13 further comprising, during other flight modes, decoupling the electric machine from the aircraft drive, wherein the electric machine does not exert a load on the engine when decoupled from the aircraft drive.

17. An aircraft, comprising:
a propeller;
an aircraft drive including an internal combustion engine, the internal combustion engine mechanically coupled to the propeller and having a drive power to drive the propeller; and
an electric machine rigidly coupled with the aircraft drive via a belt drive, wherein the internal combustion engine cooperates with the electric machine, wherein the electric machine is operated as an electric motor in a first operating mode and as an electric generator in a second operating mode, and wherein during electric motor operation the electric machine provides additional drive power amounting to 15 to 35% of a rated power of the internal combustion engine.

* * * * *